United States Patent
Haruna et al.

(10) Patent No.: US 8,102,596 B2
(45) Date of Patent: Jan. 24, 2012

(54) OPTICAL FIBER FOR AMPLIFICATION

(75) Inventors: Tetsuya Haruna, Yokohama (JP); Junji Iihara, Osaka (JP); Masashi Onishi, Yokohama (JP); Shinji Ishikawa, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 656 days.

(21) Appl. No.: 12/160,009

(22) PCT Filed: Dec. 27, 2006

(86) PCT No.: PCT/JP2006/326018
§ 371 (c)(1),
(2), (4) Date: Jan. 5, 2009

(87) PCT Pub. No.: WO2007/077860
PCT Pub. Date: Jul. 12, 2007

(65) Prior Publication Data
US 2009/0185263 A1    Jul. 23, 2009

(30) Foreign Application Priority Data
Jan. 4, 2006   (JP) ............... 2006-000198

(51) Int. Cl.
*H01S 3/067* (2006.01)
*C03C 3/06* (2006.01)
*C03C 13/04* (2006.01)
*C03C 4/08* (2006.01)

(52) U.S. Cl. .......... 359/341.5; 501/37; 501/53

(58) Field of Classification Search ........ 359/341.5, 359/341.1; 501/37, 53
See application file for complete search history.

(56) References Cited

U.S. PATENT DOCUMENTS
5,087,108 A * 2/1992 Grasso et al. ............. 385/27
(Continued)

FOREIGN PATENT DOCUMENTS
JP     10-261828     9/1998

OTHER PUBLICATIONS
Adler, D.L., Jacobson, D.C., Eaglesham, D.J., Marcus, M.A., Benton, J.L., Poate, J.M., Citrin, P.H. Local structure of 1.54-μm-luminescence Er3+ implanted in Si. Applied Physics Letters. vol. 61, Issue 18, 1992, pp. 2181-2183. ISSN: 00036951 DOI: 10.1063/1.108288.*

(Continued)

*Primary Examiner* — Mark Hellner
*Assistant Examiner* — Ari M Diacou
(74) *Attorney, Agent, or Firm* — McDermott Will & Emery LLP

(57) ABSTRACT

Provided is an erbium doped optical fiber (EDF) for amplification which allows an easy estimation of the amplification performance and high production stability. The fiber includes a core and a cladding. The core is mainly made of silica glass and doped with erbium at a concentration of 500 wtppm or more and 2500 wtppm or less. In the fiber, the cutoff wavelength is 850 nm or more and 1450 nm or less, the mode field diameter is 4.5 μm or more and 6.5 μm or less, the polarization mode dispersion is not more than 0.1 ps per 10 m, the coordination number of oxygen elements around an erbium element in the core is one or more and eight or less, and the bond length between erbium and oxygen is 0.225 nm or more and 0.235 or less.

2 Claims, 4 Drawing Sheets

U.S. PATENT DOCUMENTS

| | | | | |
|---|---|---|---|---|
| 5,225,925 | A | * | 7/1993 | Grubb et al. ............. 359/341.32 |
| 5,731,892 | A | * | 3/1998 | DiGiovanni et al. ...... 359/337.4 |
| 5,748,364 | A | * | 5/1998 | Meli et al. ................. 359/337.3 |
| 5,808,787 | A | * | 9/1998 | Meli et al. ................. 359/341.5 |
| 5,900,970 | A | * | 5/1999 | Kakui ........................ 359/337.1 |
| 5,920,086 | A | * | 7/1999 | MacFarlane et al. ......... 257/103 |
| 6,172,803 | B1 | * | 1/2001 | Masuda et al. ........... 359/337.12 |
| 6,266,181 | B1 | * | 7/2001 | Ohishi et al. ............... 359/341.1 |
| 2007/0225154 | A1 | * | 9/2007 | Yanagida et al. ............. 501/139 |

OTHER PUBLICATIONS

Diacou, Ari M. Appendix A. Unpublished. May 31, 2011.*
Kashiwada, T., et al., "Spectral gain behavior of Er-doped fiber with extremely high aluminum concentration", OAA'93, MA6, 104 (1993).

* cited by examiner

OPTICAL FIBER FOR AMPLIFICATION

RELATED APPLICATIONS

This application is the U.S. National Phase under 35 U.S.C. §371 of International Application No. PCT/JP2006/326018, filed on Dec. 27, 2006, which in turn claims the benefit of Japanese Application No. 2006-000198, filed on Jan. 4, 2006, the disclosures of which applications are incorporated by reference herein.

TECHNICAL FIELD

The present invention relates to an optical fiber for amplification.

BACKGROUND ART

Known optical amplifiers using optical fibers for amplification as an optical amplification medium are such that the cores of the optical fibers are doped with a rare-earth element such as erbium or thulium. Of such amplifiers, an erbium-doped fiber amplifier (EDFA) using an erbium-doped optical fiber (EDF) as an optical amplification medium is used in an optical communication system, because it can amplify light having a wavelength of C-band (1530 nm to 1565 nm) that is used as a signal light wavelength range in optical communication.

In an wavelength division multiplex (WDM) optical communication system, an optical amplifier is used for collectively amplifying the multiplexed multi-wavelength signal light that is transmitted therethrough. In this case, it is desirable that the gain of optical amplification be flat (that is, the relative gain deviation is small) in a signal light wavelength range including the multiwavelength signal light.

FIG. 1 is a graph showing an example of a gain spectrum of an EDF. In general, the gain spectrum of an EDF has a peak near the wavelengths of 1530 nm and 1650 nm, respectively and has a bottom near the wavelength of 1535 nm. A relative gain deviation is defined by the expression:

(Gmax−Gmin)/Gmin, where Gmax represents the maximal value among the peak values near the wavelength of 1530 nm and 1650 nm and Gmin represents the bottom value near the wavelength of 1535 nm. The smaller the relative gain deviation, the smaller the loss due to a gain equalizer can be made, and accordingly the amplification efficiency as a whole can be increased.

It is known that when the aluminum is co-doped into the core of an EDF, the relative gain deviation of the EDF becomes smaller. The literature by Kashiwada et al.: OAA'93, MA6, 104, (1993) discloses an EDF in which the aluminum is codoped at high concentration such that the relative gain deviation is largely improved.

Non-patent literature 1: T. Kashiwada et al.: OAA'93, MA6, 104, (1993)

However, there are cases in which aluminum is codoped in addition to erbium in the core of an EDF and another element such as germanium is further added to the core. When various kinds of elements are co-doped in the core, it is difficult to make EDFs stably by estimating the amplification performance from the composition of the EDF.

DISCLOSURE OF INVENTION

Problems to be Solved by the Invention

The object of the present invention is to provide an erbium doped optical fiber (EDF) for amplification which has a small relative gain deviation.

Means to Solve the Problems

In order to achieve the object, there is provided an optical fiber for amplification including (1) a core mainly made of silica glass and codoped with at least one element in addition to erbium having a concentration of 500 wtppm or more and 2500 wtppm or less and (2) a cladding, wherein the coordination number of oxygen around erbium in the core is one or more and eight or less and the bond length between the erbium element and oxygen element is 0.225 nm or more and 0.235 nm or less. In addition, the EDF preferably has a cutoff wavelength of 850 nm or more and 1450 nm or less, a mode field diameter of 4.5 μm or more and 6.5 μm or less, and a polarization mode dispersion of not more than 0.1 ps per 10 m.

Advantage of the Invention

According to the present invention, it is possible to provide an erbium doped optical fiber (EDF) for amplification which has a small relative gain deviation.

DENOTATION OF REFERENCE NUMERALS

| | |
|---|---|
| 1 optical amplifier, | 12 optical isolator |
| 11 optical fiber for amplification (EDF) | 13 optical coupler |
| 14 gain equalizer | 15 pump light source |

BEST MODE FOR CARRYING OUT THE INVENTION

An embodiment of the present invention is explained hereinafter with reference to the drawings. The drawings are directed to an explanation and are not intended to limit the scope of the invention.

Figure 1:
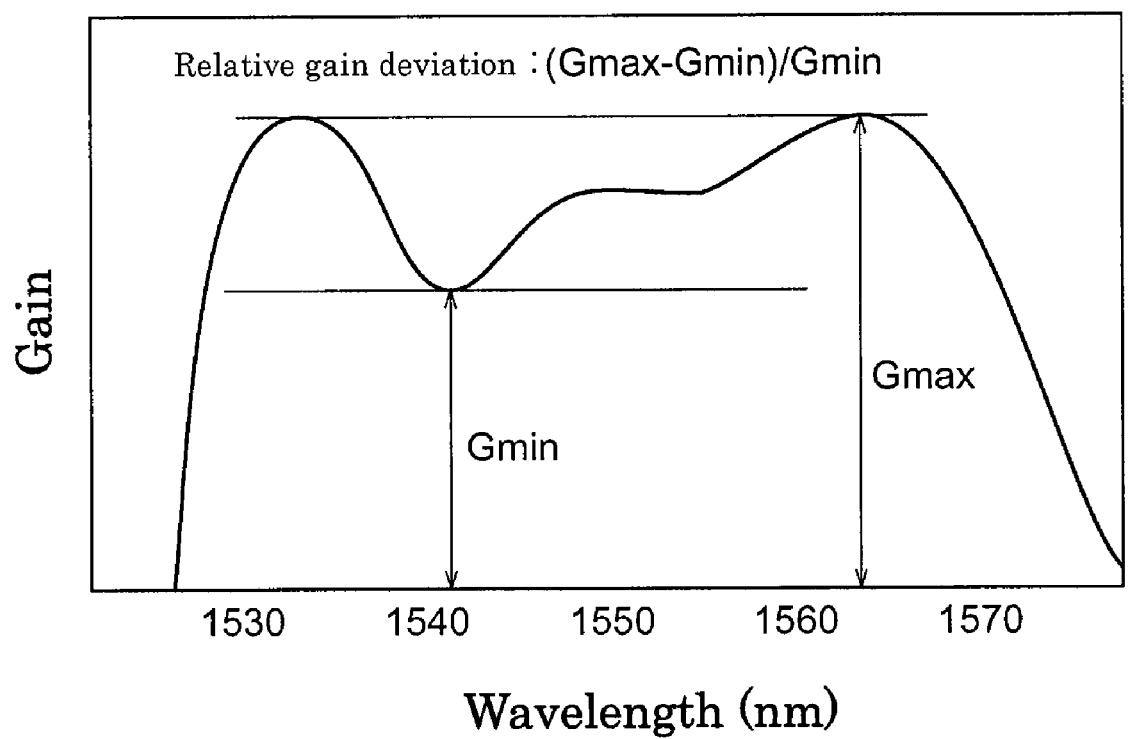
FIG. 1 is a graph showing an example of a gain spectrum of an EDF.
Figure 2:
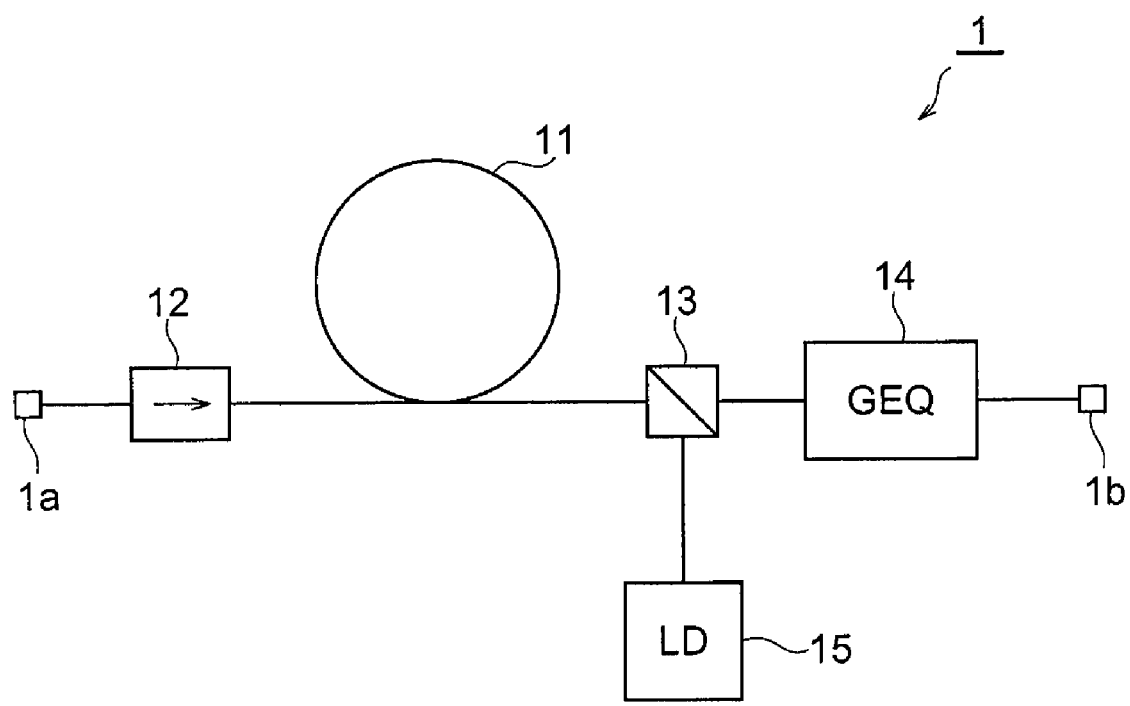
FIG. 2 is a schematic diagram showing an optical amplifier equipped with an embodiment of an optical fiber for amplification according to the present invention.
Figure 3:
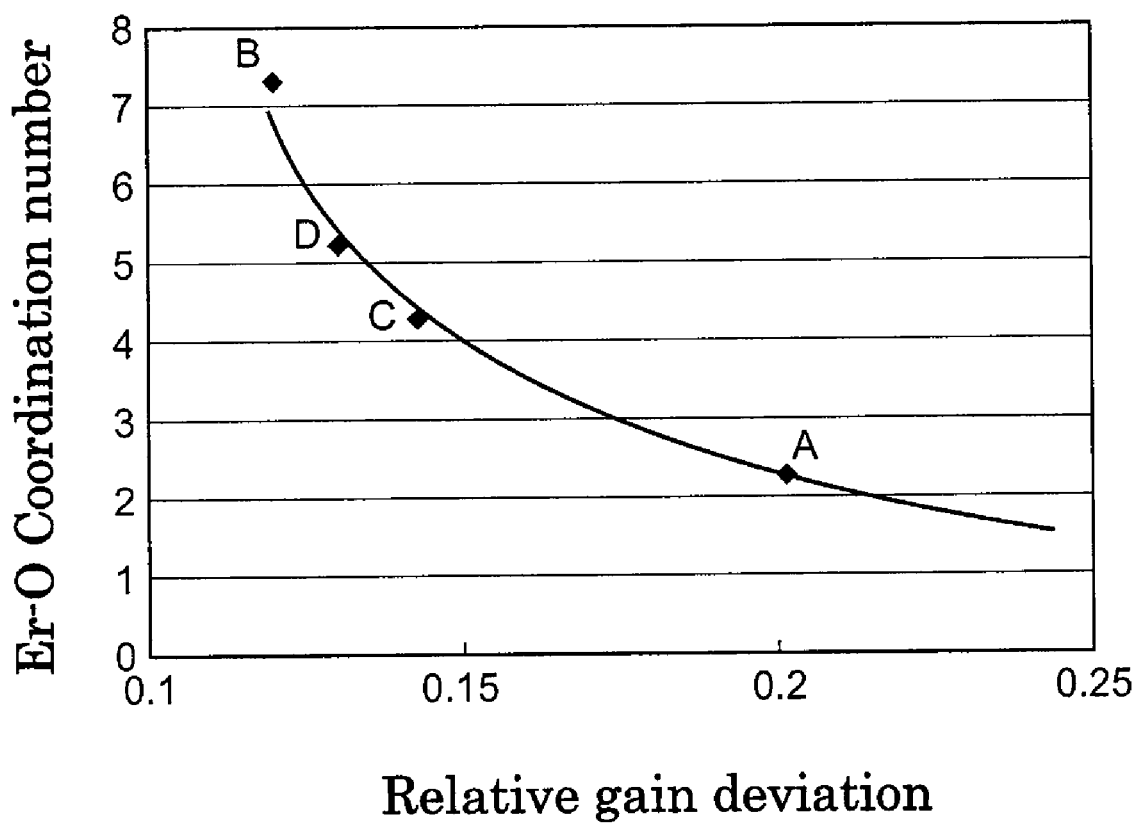
FIG. 3 is a graph showing a relationship between the coordination number of oxygen around erbium in the core and the relative gain deviation of an erbium doped optical fiber (EDF) for amplification according to an embodiment of the present invention.
Figure 4:
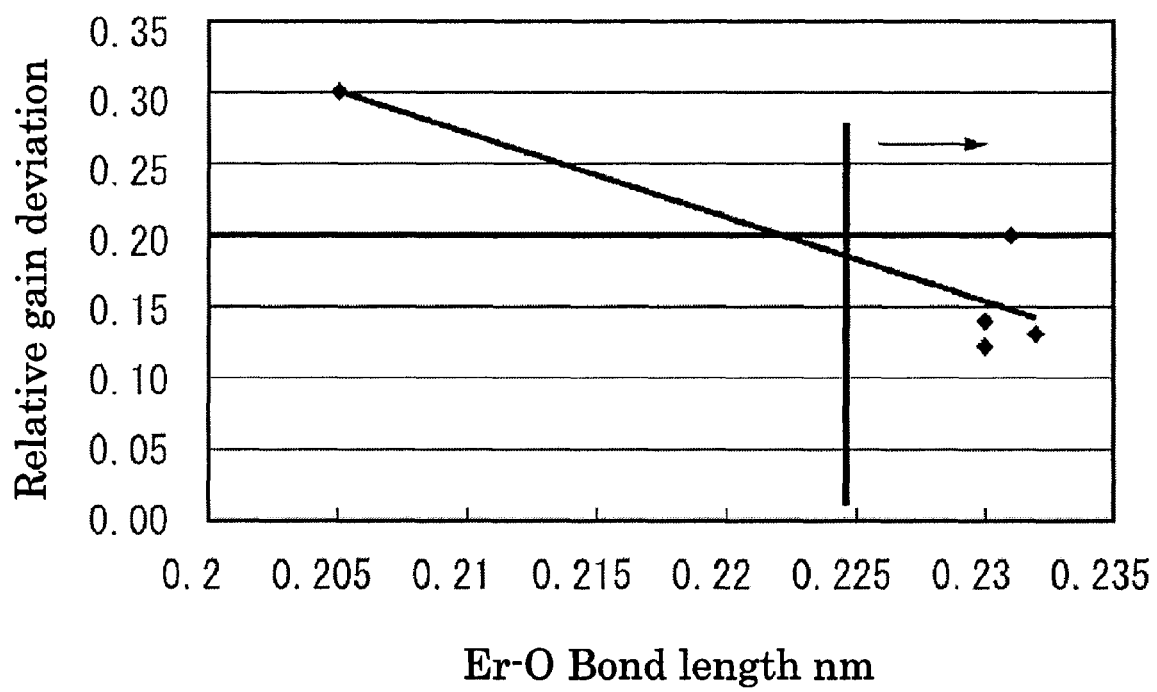
FIG. 4 is a graph showing a relationship between the bond length between the erbium element and oxygen element the core and the relative gain deviation with respect to EDFs according to an embodiment of the present invention and a comparative example.

FIG. 2 is a schematic diagram showing an optical amplifier 1 equipped with an embodiment of an optical fiber for amplification according to the present invention. The optical amplifier 1 adopts a backward pump configuration and includes an optical isolator 12, optical coupler 13, gain equalizer 14, and pump light source 15 as well as an EDF 11. The C-band signal light input to the input terminal 1a is optically amplified in the EDF 11, and the amplified signal light is output from the output terminal 1b.

the specifications of a comparative example (Sample E). FIG. 3 is a graph showing a relationship between the coordination number of oxygen elements around the erbium element in the core and the relative gain deviation with respect to the examples of EDF 11 (Samples A to D) according to the present embodiment. FIG. 4 is a graph showing a relationship between the erbium-oxygen bond length in the core and the relative gain deviation with respect to the examples (Samples A to D) and the comparative example (Sample E).

TABLE 1

| Sample Name | Composition | | | Er-Oxygen bond | | | | | Amplification performance |
| --- | --- | --- | --- | --- | --- | --- | --- | --- | --- |
| | Er content ppm | Al content wt % | Ge content wt % | Bond length nm | Coordination number | $\lambda c$ nm | MFD μm | PMD ps/10 m | Relative gain deviation |
| A | 1357 | 1.4 | 3.4 | 0.231 | 3.4 | 1357 | 5.6 | 0.05 | 0.20 |
| B | 1002 | 6.7 | 1.4 | 0.230 | 7.3 | 1002 | 4.5 | 0.04 | 0.12 |
| C | 1022 | 3.7 | 3.8 | 0.230 | 4.3 | 1022 | 5.7 | 0.02 | 0.14 |
| D | 958 | 6.5 | 4.1 | 0.232 | 5.2 | 958 | 5.8 | 0.03 | 0.13 |
| E | 840 | 0.0 | 3.9 | 0.205 | 3.8 | 840 | 6.0 | 0.01 | 0.30 |

The EDF 11 includes a core made of silica glass as the main composition and a cladding. Erbium is doped in the core at a concentration of 500 wtppm or more and 2500 wtppm or less. In the core, the coordination number of oxygen around the erbium is one or more and eight or less, and the bond length between the erbium element and the oxygen element is 0.225 nm or more and 0.235 nm or less. The EDF 11 has the following properties: a cutoff wavelength of 850 nm or more and 1450 nm or less; mode field diameter of 4.5 μm or more and 6.5 μm or less; and polarization mode dispersion of not more than 0.1 ps per 10 m. In the EDF 11, preferably, aluminum is co-doped in the core, and the coordination number of the oxygen element around the erbium element in the core is four or more and eight or less.

The optical isolator 12, which is arranged between the input terminal 1a and the EDF 11, passes light in the forward direction but does not pass light in the backward direction. The optical coupler 13, which is provided between the EDF 11 and the output terminal 1b, receives pump light from the pump light source 15 and outputs the pump light to the EDF 11, while the coupler 13 also receives signal light amplified in the EDF 11 and outputs the signal light to the output terminal 1b. The gain equalizer 14, which is arranged between the optical coupler 13 and the output terminal 1b, has such a transmission spectrum as to cancel the gain spectrum of the EDF 11 in the C-band, whereby it makes the gain spectrum of the optical amplifier 1 flat as a whole. The pump light source 15, which is provided to output pump light having a wavelength (0.98 μm band or 1.48 μm band) capable of pumping the erbium element doped in the core of the EDF 11, preferably includes a laser diode.

The pump light output from the pump light source 15 is supplied to the EDF 11 from the downstream side of the signal light through the optical coupler 13. The C-band signal light that has been put into the input terminal 1a is input into the EDF 11 through the optical isolator 12 and is optically amplified in the EDF 11. The optically amplified signal light is put into the gain equalizer 14 through the optical coupler 13 so as to be subjected to loss according to the wavelength in the gain equalizer 14, and is output from the output terminal 1b.

Table I shows the specifications of examples (Samples A to D) of EDF 11 according to the present embodiment as well as As can be seen from Table I and FIG. 4, the EDF of Sample E in a comparative example, which has a relative gain deviation of 0.30 and a erbium-oxygen bond length of 0.205 nm, that is, about 0.025 nm shorter as compared with the EDFs of Samples A to D in the examples. Thus the former is inferior to the latter. In order to make it possible to utilize a gain equalizer exhibiting small attenuation and to increase efficiency of the amplifier as a whole, the relative deviation of the EDF must be 0.20 or less, that is, the erbium-oxygen bond length must be 0.225 nm or more. Also, as can be seen from Table I and FIG. 3, the larger the coordination number of the oxygen elements around the erbium element, the smaller the relative gain deviation, and accordingly an EDF having higher amplification efficiency can be achieved. When the Er—O bond length is 0.225 nm or more, the larger the Er—O coordination number, the smaller the relative gain deviation becomes, and accordingly an EDF having sufficient amplification performance can be produced. Preferably, the Er—O coordination number is four or more, and the Er—O bond length is 0.230 nm or more.

Changes of the absorption spectrum and fluorescence spectrum of erbium added to silica glass are caused by changes of the ligand field of erbium due to the structure of Er—O—X or Er—X—O which a co-doped element "X" has with respect to the erbium element. Therefore, a direct method for determining the amplification property of an EDF is to control the ligand field around an erbium element.

By doping silica glass with rare-earth elements and co-doped elements in a decomposed state of atoms, it is possible to efficiently coordinate the co-doped elements near the rare-earth elements. Also, the coordination state of the rare-earth elements can be evaluated by evaluating a ligand field around the rare-earth element with an X-ray absorption fine structure (EXFS) method using a large-scale synchrotron radiation facility. Therefore, it is possible to solve the problem of difficulty in estimation of amplification performance and the consequential low stability in production. Moreover, more accurate estimation of properties can be made possible by estimating amplification property on the basis of coordination number of oxygen around the rare-earth element, rather than on the basis of concentration of co-doped elements.

This application is based on the Japanese patent application No. 2006-198 filed on Jan. 4, 2006, and the entire disclosure of the application is incorporated herein by reference.

INDUSTRIAL APPLICABILITY

The present invention can provide an EDF which allows ease in estimating the amplification performance and high production stability. It is especially effective in a WDM transmission system which requires flat amplification property.

The invention claimed is:

1. An optical fiber for amplification comprising a core and a cladding, the core being mainly made of silica glass and codoped with at least one element in addition to erbium, a concentration of the erbium being 500 wtppm or more and 2500 wtppm or less, wherein:

the coordination number of oxygen around erbium in the core is four or more and eight or less, and the bond length between the erbium and oxygen is 0.230 nm or more and 0.235 nm or less.

2. The optical fiber for amplification according to claim 1, wherein the at least one element is aluminum.

* * * * *